United States Patent [19]
Napolitano et al.

[11] 3,795,872
[45] Mar. 5, 1974

[54] PROTECTION SCHEME FOR CLOCK SIGNAL RECOVERY ARRANGEMENT

[75] Inventors: Orlando Napolitano, Cliffwood; Gerald Philip Pasternack, Colts Neck; Burton R. Saltzberg, Middletown, all of N.J.

[73] Assignee: Bell Telephone Laboratories, Incorporated, Murray Hill, N.J.

[22] Filed: Sept. 18, 1972

[21] Appl. No.: 289,948

[52] U.S. Cl. .................................... 331/49, 331/55
[51] Int. Cl. .............................................. H03b 3/04
[58] Field of Search .......... 331/2, 49, 55; 340/172.5

[56] References Cited

UNITED STATES PATENTS

| | | | |
|---|---|---|---|
| 3,289,097 | 11/1966 | Martin | 331/49 |
| 3,370,251 | 2/1968 | Overstreet | 331/49 |
| 3,599,111 | 8/1971 | Butler | 331/55 |
| 3,628,158 | 12/1971 | Sjoquist | 331/49 |
| 3,662,277 | 5/1972 | White | 331/49 |

*Primary Examiner*—Paul J. Henon
*Assistant Examiner*—Michael Sachs
*Attorney, Agent, or Firm*—R. C. Lipton

[57] ABSTRACT

Clocking signals are recovered from an incoming signal train by a master clock oscillator phase locked to the incoming signals and, in the event of failure of the master clock, by a standby clock similarly phase locked to the incoming signals. When an outage of the incoming signal is detected, or when it is presumed that the incoming signals are being improperly received, both clocks are unlocked from the incoming signals and the standby clock is phase locked to the output of the master. If there is subsequent phase slippage of the standby, it is unlocked from the master and both clocks run free. In one operational sequence, both clocks are again phase locked to the incoming signals if signal reception is restored.

6 Claims, 7 Drawing Figures

FIG. 4

NEXT STATE TRANSMISSION TABLE
COMBINATIONAL LOGIC 203

| PRESENT STATE A,B,C,D \ INPUT $F, S_1, S_2, T$ | 0000 | 0001 | 0010 | 0011 | 0100 | 0101 | 0110 | 0111 | 1000 | 1001 | 1010 | 1011 | 1100 | 1101 | 1110 | 1111 |
|---|---|---|---|---|---|---|---|---|---|---|---|---|---|---|---|---|
| 0000 | 1000 | 1000 | 1000 | 1000 | 1000 | 1000 | 1000 | 1000 | 0000 | 0000 | 0010 | 0001 | 0100 | 0001 | 0010 | 0001 |
| 0001 | 1001 | 1001 | 0001 | 0001 | 1001 | 1001 | 0001 | 0001 | 0001 | 0001 | 0001 | 0001 | 0001 | 0001 | 0001 | 0001 |
| 0010 | 0011 | 0011 | 0011 | 0011 | 0011 | 0011 | 0011 | 0011 | 0010 | 0010 | 0010 | 0010 | 0110 | 0110 | 0110 | 0110 |
| 0011 | 0011 | 0011 | 0011 | 0011 | 0011 | 0011 | 0011 | 0011 | 0010 | 0010 | 0010 | 0010 | 0010 | 0010 | 0010 | 0010 |
| 0100· | 0101 | 0101 | 0101 | 0101 | 0101 | 0101 | 0101 | 0101 | 0100 | 0100 | 1100 | 1100 | 0100 | 0100 | 1100 | 1100 |
| 0101 | 0101 | 0101 | 0101 | 0101 | 0101 | 0101 | 0101 | 0101 | 0100 | 0100 | 0100 | 0100 | 0100 | 0100 | 0100 | 0100 |
| 0110 | 0110 | 0110 | 0110 | 0110 | 0110 | 0110 | 0110 | 0110 | 0110 | 0110 | 0110 | 0110 | 0110 | 0110 | 0110 | 0110 |
| 1000 | 1001 | 1001 | 1001 | 1001 | 1001 | 1001 | 1001 | 1001 | 0000 | 0000 | 0000 | 0000 | 0000 | 0000 | 0000 | 0000 |
| 1001 | 1001 | 1001 | 1011 | 1011 | 1001 | 1001 | 1011 | 1011 | 1000 | 1000 | 1000 | 1000 | 1000 | 1000 | 1000 | 1000 |
| 1010 | 1000 | 1000 | 1000 | 1000 | 1000 | 1000 | 1000 | 1000 | 1000 | 1000 | 1000 | 1000 | 1000 | 1000 | 1000 | 1000 |
| 1011 | 1011 | 1011 | 1011 | 1011 | 1011 | 1011 | 1011 | 1011 | 1010 | 1010 | 1011 | 1011 | 1010 | 1010 | 1011 | 1011 |
| 1100 | 1101 | 1101 | 1101 | 1101 | 1101 | 1101 | 1101 | 1101 | 1101 | 1101 | 1101 | 1101 | 1101 | 1101 | 1101 | 1101 |
| 1101 | 1101 | 1101 | 1101 | 1101 | 1101 | 1101 | 1101 | 1101 | 1101 | 1101 | 1101 | 1101 | 1101 | 1101 | 1101 | 1101 |

FIG. 5
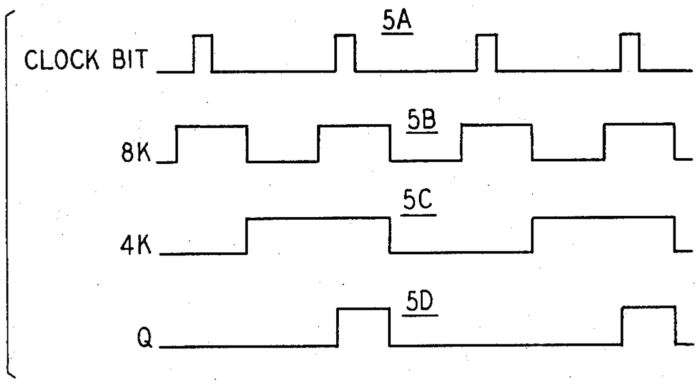
FIG. 6
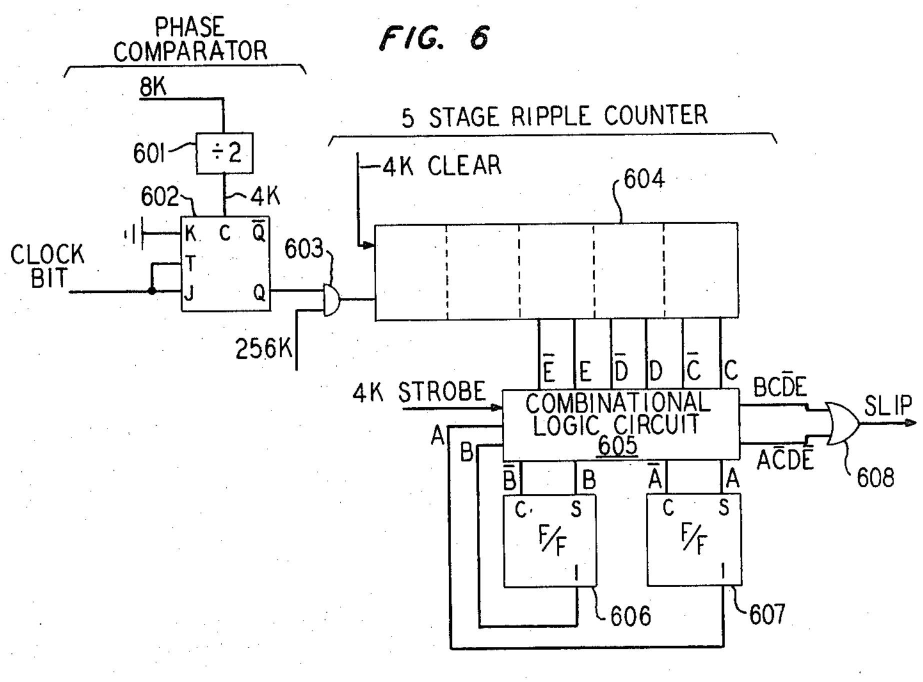
FIG. 7
NEXT STATE TRANSMISSION TABLE
COMBINATIONAL LOGIC 605
| PRESENT STATE A,B \ INPUT C,D,E | 000 | 001 | 010 | 011 | 100 | 101 | 110 | 111 |
|---|---|---|---|---|---|---|---|---|
| 00 | * | * | 01 | 00 | 00 | 10 | * | * |
| 01 | 01 | 01 | 01 | 00 | 00 | 10 | 01 | 01 |
| 10 | 10 | 10 | 01 | 00 | 00 | 10 | 10 | 10 |

PROTECTION SCHEME FOR CLOCK SIGNAL RECOVERY ARRANGEMENT

FIELD OF THE INVENTION

This invention relates to clock signal recovery circuits and, more particularly, to systems of redundant phase-locked oscillators (VCO's) which insure uninterrupted service in the event of a failure or a malfunction of one of the oscillators.

DESCRIPTION OF THE PRIOR ART

In synchronous signaling systems, such as time-division multiplex systems, it is necessary to have a continuous and uninterrupted clocking signal to properly receive and distribute incoming signal trains. The clock signal recovery circuit preferably comprises a master clock oscillator which is phase locked to the signal train and which has sufficient stability to maintain this synchronism despite momentary outages and losses of the incoming train. In addition, a standby oscillator is provided, the standby being similarly phase locked to the incoming signal train and, consequently, in synchronism with the master clock. Equipment sensed output failure of the master clock and, assuming no failure of the standby clock output, automatically switches over to the standby. Since the standby is in phase with the incoming train, the switching does not interrupt the reception and distribution of the incoming signals in the train.

It is also known to provide other sensings which indicate malfunctions other than failure to provide output clocking signals. Typical malfunction sensings include detecting whether the phase of a clock output slips or changes significantly with respect to the phase of the signal train, which significant change is hereinafter referred to as phase slippage; tracking the phase difference between the outputs of the master clock and the standby; and detecting prolonged loss of the incoming signal train.

The malfunction sensings do not provide sufficient information to determine whether or not the master clock (or the standby clock) is operating properly during periods of outages or improper reception of the signal train. Moreover, during the outage or improper reception, the clocks tend to drift away from each other and, if the master clock should fail, switching is accompanied by phase shift in the clocking signal.

It is the object of this invention to eliminate phase shift due to switching of the clock outputs during periods of signal outages or improper reception and to provide additional information, during these periods, as to whether the clocks are operating properly.

SUMMARY OF THE INVENTION

In accordance with the present invention, when an outage of the incoming signal is detected or when the incoming signal is being improperly received (it being presumed that the signal train is being improperly received when phase slippage is detected while the clocks are still tracking each other), both clocks are unlocked from the input and the standby clock is phase locked to an output of the master clock while the master runs free. With the standby phase locked to the master, no phase shift of the clocking signal occurs if the master clock should fail. Moreover, so long as there is no phase slippage of the standby with respect to the output of the master, it can be presumed that the clocking signal of the master is being maintained within a reasonable range, that the standby is properly following the master and that therefore both the master and the standby are operating properly.

In the illustrative embodiment, described hereinafter, the standby clock is unlocked from the master if phase slippage of the standby is detected, whereby both clocks run free.

In accordance with another feature of this invention, both clocks are again phase locked to the incoming signal train if incoming signal reception is restored.

The foregoing and other objects and features of this invention will be more fully understood from the following description of an illustrative embodiment thereof taken in conjunction with the accompanying drawings.

BRIEF DESCRIPTION OF THE DRAWINGS

In the drawing:

FIG. 4 shows a table identifying input information and output information thereby produced by a combinational logic circuit which forms part of the switching circuit;

FIG. 5 discloses timing waves produced by various equipment in the clock recovery system;

FIG. 6 discloses, in schematic form, the details of a slip detector which detects phase slippage of the clocks; and FIG. 7 depicts a table identifying input information and output information thereby produced by a combinational logic circuit which forms part of the slip detector.

DETAILED DESCRIPTION

Figure 1:
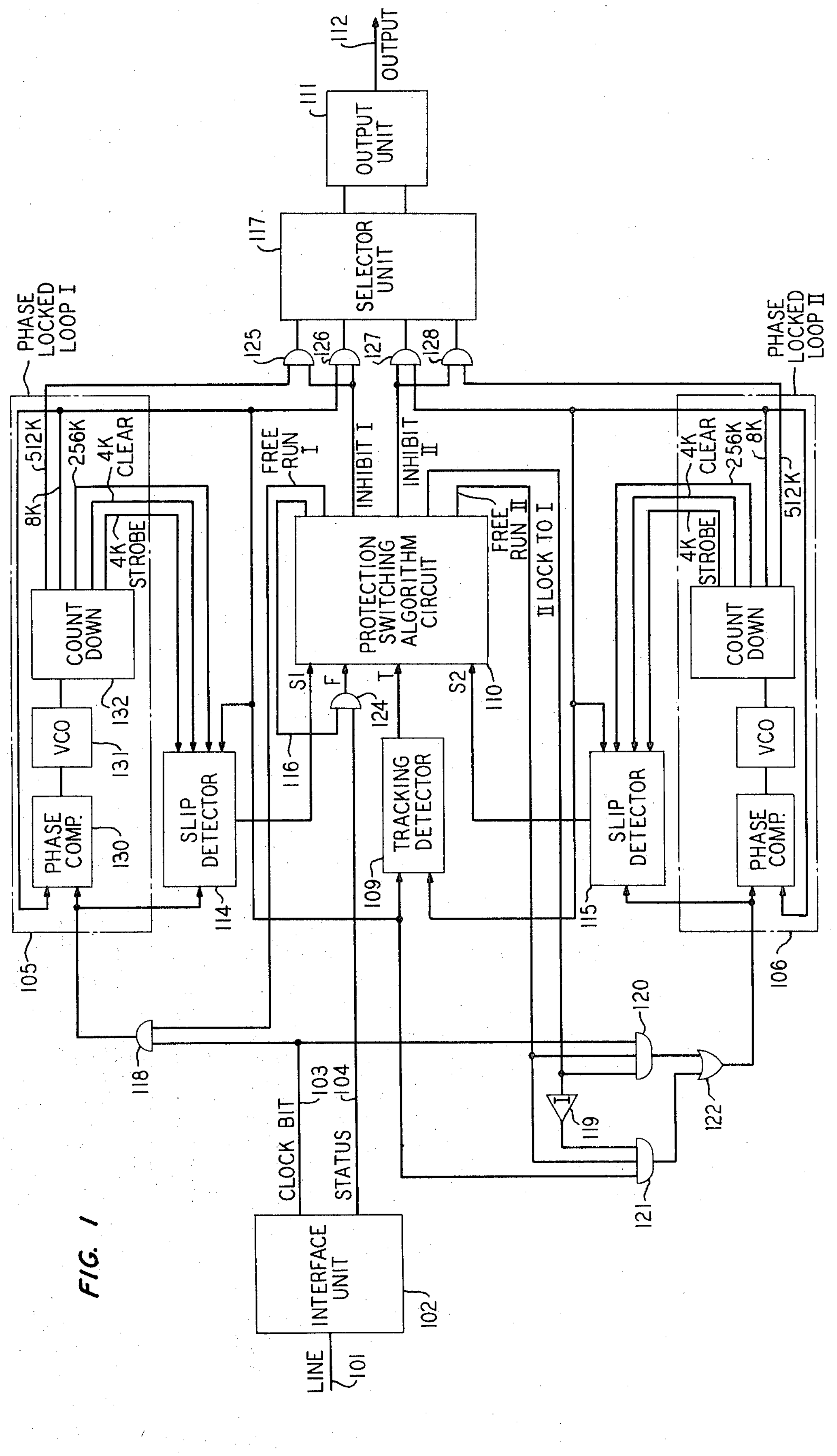
FIG. 1 shows, in schematic form, a redundant phase-locked oscillator clock recovering system in accordance with this invention.

In accordance with the specific embodiment shown in FIG. 1, a first phase-locked loop, identified as block 105, and a second phase-locked loop, identified as block 106, are locked in phase with an incoming clock bit signal. This incoming clock bit signal comprises a sequence of bits occurring at the repetition rate of eight kilobits per second (kbs), which sequence is superimposed on a high-speed bit train received over line 101. Interface unit 102 detects the clock signal bits and applies the clock bits to clock bit lead 103. The clock bit detection circuitry in interface 102 advantageously comprises circuitry of the type disclosed in FIG. 2 of the copending application of K. W. Boyd-B. R. Saltzberg-H. M. Zydney, Ser. No. 266,686, filed June 27, 1972. This resultant clock bit signal on lead 103 is depicted as timing wave 5A in FIG. 5.

Interface unit 102 also provides an enabling, or high potential, to STATUS lead 104 so long as the clock bits are being recovered from the high-speed bit train on line 101. Interface unit 102 also includes a timing circuit which times out if there is a loss or outage of the incoming signals and the clock bits are not recovered for a predetermined interval and which, upon timing out, lowers the potential applied to STATUS lead 104.

The signal on lead 104 is passed through normally enabled gate 124 to input terminal F of protection switching algorithm circuit 110.

The clock bits on lead 103 are passed through normally enabled gate 118 to phase-locked loop 105 and are passed through normally enabled gate 120 and OR gate 122 to phase-locked loop 106. Phase-locked loop 105 includes phase comparator 130, voltage control oscillator 131 and countdown circuit 132, which is a conventional binary counter. Voltage control oscillator 131 provides to countdown circuit 132 a signal wave having a frequency which is an integral multiple of 512 kiloHertz. This 512 kHz wave is divided down by countdown circuit 132 to provide five wave outputs; namely, a 512 kHz square wave, a 256 kHz square wave, an 8 kHz square wave, a strobe pulse having a 4 kbs repetition rate and a clear pulse having a 4 kbs repetition rate, the strobe pulse leading the clear pulse in phase. The 8 kHz square wave, which is depicted as timing wave 5B in FIG. 5, is fed back to one input of phase comparator 130, the other input of phase comparator 130 comprising the incoming 8 kbs clock bit signal. Phase comparator 130, therefore, provides at its output a voltage determined by the phase difference between the two waves, which voltage controls the frequency of voltage control oscillator 131 and countdown circuit 132, therefore, operate as a conventional phase-locked loop and the outputs of countdown circuit 132 are locked in phase with the incoming 8 kbs clock bit signal.

Phase-locked loop 106 is arranged in substantially the same manner as phase-locked loop 105. Phase-locked loop 106, of course, is locked in phase with the incoming 8 kbs clock bit signal being passed through OR gate 122 and provides at its outputs a 512 kHz square wave, a 256 kHz square wave, an 8 kHz square wave, a 4 kbs strobe pulse and a 4 kbs clear pulse in the same manner as the corresponding outputs are provided by phase-locked loop 105.

The 512 kHz wave and 8 kHz wave outputs of countdown circuit 132 of phase-locked loop 105 are passed to gates 125 and 126, respectively. Assuming the gates are enabled, the 512 kHz and 8 kHz waves are passed to selector unit 117.

Similarly, the 512 kHz and 8 kHz outputs of phase-locked loop 106 are passed to gates 127 and 128, respectively, and in the event that these gates are enabled, the signals are passed therethrough to selector unit 117.

Selector unit 117 advantageously includes a conventional relaying unit (not shown) which either passes the outputs of gates 125 and 126 therethrough or, alternatively, passes the outputs of gates 127 and 128 therethrough. Selector unit 117 is preferably arranged to monitor the 8 kHz wave outputs of gates 126 and 127 and normally pass the outputs of gates 125 and 126 through the relaying unit except when the 8 kHz wave appears at the output of gate 127 and not at the output of gate 126, whereupon the relaying unit of selector unit 117 passes the outputs of gates 127 and 128 through. This action of selector unit 117 has the effect of selecting phase-locked loop 105 as the main oscillator since its output is passed through so long as the 8 kHz wave output is detected by selector unit 117. Phase-locked loop 106 is designated as the standby oscillator, its output being passed through selector unit 117 in the event that phase-locked loop 105 fails and no longer provides an 8 kHz wave to gate 126 or in the event that loop 105 has a malfunction of the type which permits phase slippage between the loop and the incoming clock bit signal, whereupon, as described hereinafter, gate 126 is disabled to block the 8 kHz wave.

The outputs of selector unit 117 are passed to output unit 111, which creates a composite signal from the 512 kHz and the 8 kHz waves and passes the composite signal to output lead 112 for distribution to digital circuits, not shown, which utilize the clock signals. Suitable circuitry for output unit 111 is shown in FIG. 1 of the above-identified K. W. Boyd et al. application.

The 256 kHz output wave, the 8 kHz output wave, the 4 kbs clear pulse and the 4 kbs strobe pulse, all derived from phase-locked loop 105, are applied to slip detector 114. In general, the function of slip detector 114 is to monitor the output of phase-locked loop 105 and compare this output with the incoming 8 kbs clock bit signal being passed through gate 118 to determine if there is a cycle slippage; that is, to determine if the incoming clock signal slips one cycle behind the phase-locked loop 8 kHz signal or the loop 8 kHz signal slips one cycle behind one incoming 8 kbs clock signal. As described in detail hereinafter, the output of slip detector 114 is normally low and the output goes high if there is a cycle slippage. This output is passed to the $S_1$ input terminal of protection switching algorithm circuit 110.

The 256 kHz and 8 kHz waves and the 4 kbs clear and strobe pulses of phase-locked loop 106 are applied to slip detector 115, which also monitors the 8 kbs clock bit signal passed through OR gate 122 to determine whether a slip occurs between the incoming 8 kbs clock bit signal and the output of phase-locked loop 106. The output of slip detector 115 is normally low and goes high in the event that a cycle slippage occurs. This output is applied to the $S_2$ input terminal of protection switching algorithm circuit 110.

The 8 kHz square wave outputs of phase-locked loop 105 and phase-locked loop 106 are also applied to tracking detector 109. Tracking detector 109 comprises a conventional phase comparator and determines the difference in phase between the outputs of phase-locked loops 105 and 106. If the difference in phase between the two loops exceeds a predetermined threshold, the normally high output of tracking detector 109 goes low. This output is applied to input terminal T of protection switching algorithm circuit 110.

Protection switching algorithm circuit 110 is arranged to operate as a sequential machine, as described in detail hereinafter. As previously described, four input terminals; namely, terminals F, $S_1$, $S_2$ and T are provided for the circuit. The information on these terminals advises protection switching algorithm circuit 110 whether the incoming clock bits are being received, whether a slip has occurred between the input and output of either one of the phase-locked loops, and whether or not the outputs of the phase-locked loops are tracking each other. In general, protection switching algorithm circuit 110 cycles through various states in response to various successive permutations of conditions applied to the input terminals and, in the several states, provides various functions, alternatively and in combination, the major functions comprising phase locking the loops to the incoming clock bit signal, permitting the loops to free run, and phase locking one loop to the output of the other loop. In addition, protection switching algorithm circuit 110 has the capability of inhibiting the output of one or the other of the loops. To provide these functions, protection switching algorithm circuit 110 has five output leads. The output lead identified as FREE RUN I extends to gate 118. When protection switching algorithm circuit 110 lowers the potential on lead FREE RUN I, gate 118 is disabled, blocking the passage of the clock bit signals therethrough, whereupon phase comparator 130 finds no phase error and does not modify the frequency of voltage controlled oscillator 131; thus phase-locked loop 105 free runs. When protection switching algorithm circuit 110 lowers the potential on output lead FREE RUN II, gate 120 is disabled, blocking the passage of the clock bit signal therethrough. At the same time, gate 121 is disabled. As a consequence, no signal wave can pass through OR gate 122 and phase-locked loop 106 runs free.

When protection switching algorithm circuit 110 drops the potential on lead INHIBIT I, normally enabled gates 125 and 126 are disabled. Accordingly, the previously described outputs of phase-locked loop 105 which extend to selector unit 117 are blocked by gates 125 and 126. Conversely, if protection switching algorithm circuit 110 drops the potential on lead INHIBIT II, normally enabled gates 127 and 128 are disabled. The previously described outputs of phase-locked loop 106, which extend to selector unit 117, are blocked by gates 127 and 128.

In the normal state of protection switching algorithm circuit 110, a high potential is applied to output lead II LOCK TO I. This enables gate 120 and disables gate 121 by way of inverter 119 (presuming that protection switching algorithm circuit 110 is also applying a high potential to output lead FREE RUN II). With gate 120 enabled, the clock bit signal on lead 103 is passed through the gate and through OR gate 122, locking phase-locked loop 106 to the incoming clock signal. If protection switching algorithm circuit 110 lowers the potential on output lead II LOCK TO I, gate 120 is disabled and gate 121 is enabled by way of inverter 119. The 8 kHz square wave output of phase-locked loop 105 is thereupon passed through gate 121 and OR gate 122 to phase-locked loop 106. Phase-locked loop 106 is therefore locked to the output of phase-locked loop 105.

Another output of protection switching algorithm circuit 110 is applied to lead 116. When a low potential is applied thereto, gate 124 is disabled and a low condition is maintained on input terminal F.

Figure 2:
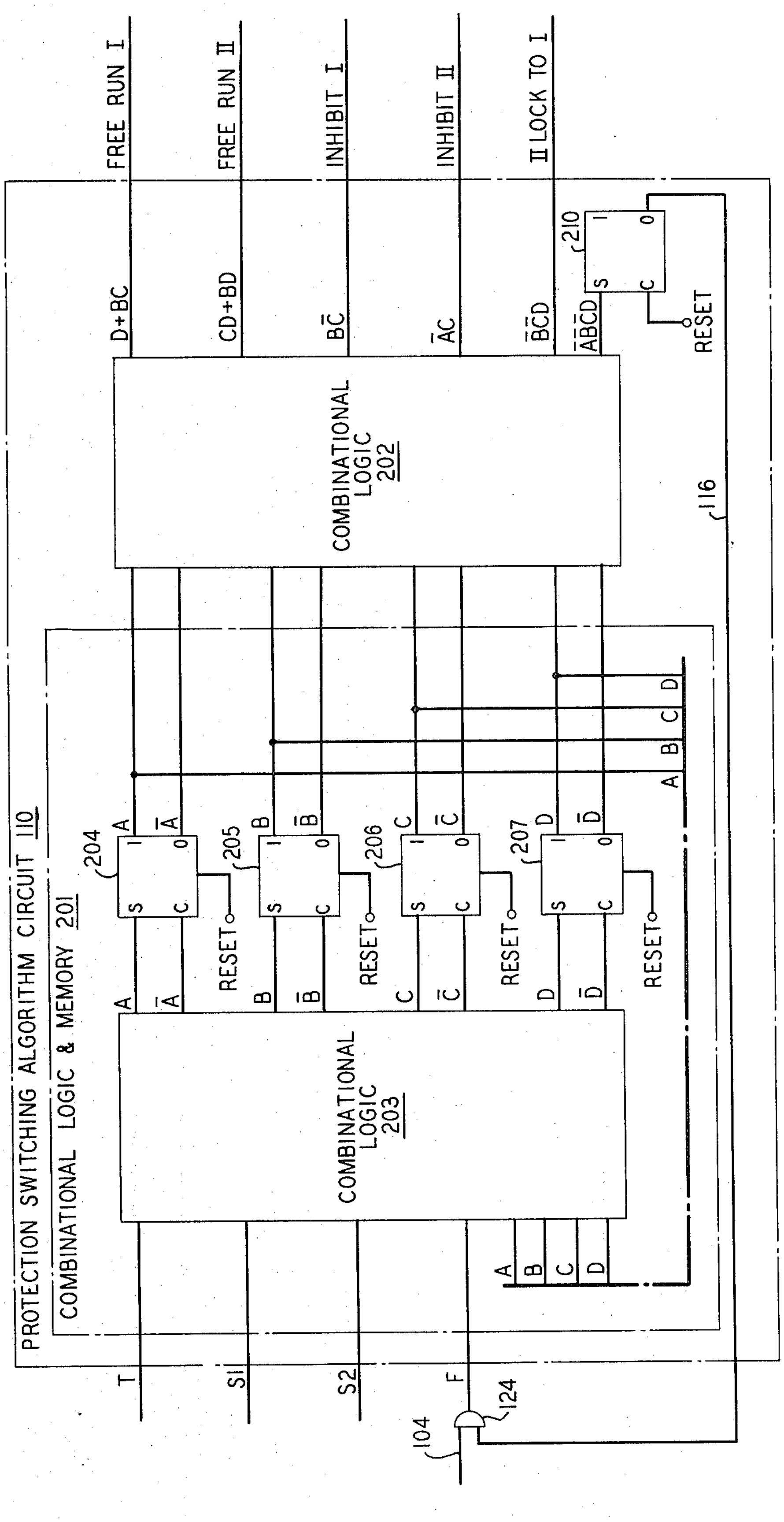
FIG. 2 depicts the details of a sequential machine switching circuit which forms part of the clock recovery system.

As seen in FIG. 2, protection switching algorithm circuit 110 generally includes combinational logic and memory circuit 201 and combinational logic circuit 202. Combinational logic and memory circuit 201 comprises combinational logic circuit 203 and flip-flops 204 through 207. Combinational logic circuit 203 has four sets of outputs, which are identified as outputs A,$\bar{A}$, B,$\bar{B}$, C,$\bar{C}$ and D,$\bar{D}$. These outputs control the conditions of flip-flops 204 through 207. The outputs of flip-flops 204 through 207 are designated as leads A,$\bar{A}$, B,$\bar{B}$, C,$\bar{C}$ and D,$\bar{D}$, since they store the output conditions of the correspondingly identified outputs of combinational logic circuit 203. The latter leads A through D are then fed back to inputs of combinational logic circuit 203, other inputs of combinational logic circuit 203 being provided by input terminals T, $S_1$, $S_2$ and F.

Combinational logic circuit 203 comprises a network of static logic circuits which respond to each of the various permutations of conditions applied to the inputs by providing a discrete permutation of conditions to its output. Multiterminal logic circuits of this type, which determine output conditions in response to sets of input variables, are described, for example, in Chapter 9, pages 135 to 156, of Introduction to the Logical Design of Switching Systems, by H. C. Torng, published by Addison-Wesley Publishing Company, Copyright 1964. The summary of the various possible input permutations and resultant output permutations is defined in the Next State Transmission Table shown in FIG. 4. In the table, each horizontal row defines the "present state" of combinational logic and memory circuit 201, which state comprises the several conditions on leads A through D fed from flip-flops 204 through 207 to the input of logic circuit 203. In accordance with the table, a high condition on any one of these leads constitutes a "1" bit, whereas a low condition constitutes a "0" bit. Thus, the first horizontal row defines the state 0000 and the lowermost defines the state 1101, the latter condition existing when high potentials are applied to leads A, B and D and a low potential is applied to lead C. Each vertical column defines the permutations of conditions on input terminals F, $S_1$, $S_2$ and T of protection switching algorithm circuit 110. The first or leftmost of the vertical columns in FIG. 4 depicts the permutation 0000, indicating low conditions on terminals F, $S_1$, $S_2$ and T, and the last or rightmost column depicts the permutation 1111, indicating high conditions on the terminals. The intersection of each row and column defines the permutation of output conditions of combinational logic circuit 203 when the input conditions conform to that row and column. As an example, when the present state comprises 1101 and the input terminal conditions comprise 1111, the output permutation is 1101 and combinational logic circuit 203 applies "1" bits to its output leads A, B, $\bar{C}$, and D to set flip-flops 204, 205 and 207 and to clear flip-flop 206. It is apparent that combinational logic and memory circuit 201 comprises a sequential machine wherein input leads A, B, C and D of logic circuit 203 comprise the present state of the machine and output leads A through D and $\bar{A}$ through $\bar{D}$ of logic circuit 203 designate the next state of the machine.

The output leads of flip-flops 204 through 207 are also passed to combinational logic circuit 202. Combinational logic circuit 202 comprises a plurality of static logic circuits providing permutations of conditions to its output lead in accordance with the conditions applied to its input leads. Normally, all the output leads of combinational logic circuit 202 are in a relatively high condition. The condition of various ones of its output leads does low, however, in the event that predetermined permutations of input signals are applied to its input. These predetermined permutations are shown algebraically in FIG. 2. The uppermost of the output leads is identified by the algebraic expression $D + BC$, designating that this lead goes low in the event that "1" bits are applied by combinational logic and memory circuit 201 to lead D or to leads B and C. This output lead then extends to output lead FREE RUN I of protection switching algorithm circuit 110. As previously described, a low potential on lead FREE RUN I unlocks phase-locked loop 105 from the incoming clock bit signal and the loop runs free.

The next uppermost output lead is designated by the algebraic expression CD + BD, indicating that the lead goes negative in the event that "1" bits are applied to leads C and D or to leads B and D. This lead extends to output lead FREE RUN II and the application of the low potential to the lead unlocks phase-locked loop 106 from the incoming clock bit signal and the loop runs free.

The third output lead is designated by the algebraic expression $B\bar{C}$, indicating that the lead goes low when "1" bits are applied to leads B and $\bar{C}$. This third lead is connected to output lead INHIBIT I and the application of the low potential to this lead disables gates 125 and 126 to block the passage of the outputs of phase-locked loop 105 to selector unit 117.

The fourth output lead defines the algebraic expression $\bar{A}C$, going low when "1" bits are applied to both of the correspondingly identified input leads. The fourth lead is connected to output lead INHIBIT II and the application of the low potential disables gates 127 and 128 to block the passage of the outputs of phase-locked loop 106 to selector unit 117.

The next to lowest output lead of combinational logic circuit 202 defines the algebraic expression $\bar{B}\bar{C}D$ and therefore goes low when "1" bits are applied to input leads $\bar{B}$, $\bar{C}$ and D. This output lead is connected to output lead II LOCK TO I and the application of the low potential with a high potential on lead FREE RUN II locks phase-locked loop 106 to the output of phase-locked loop 105.

The final or lowermost output lead defines the algebraic expression $\bar{A}B\bar{C}D$ and when "1" bits are simultaneously applied to all the correspondingly identified input leads, the condition of this output lead goes low, setting flip-flop 210. The setting of flip-flop 210 disables normally enabled gate 124, to block the application of the status information maintained on lead 104 from input terminal F. A low condition is thereupon maintained on terminal F for reasons described hereinafter.

The initial "normal" state of protection switching algorithm circuit 110 is achieved by clearing flip-flops 204 through 207 and flip-flop 210. This can be provided by any conventional manually operable means which, upon operation, applies a pulse via RESET terminals to the CLEAR inputs of all the flip-flops. All the flip-flops are thus initially in the CLEAR state, output leads A, B, C and D are low ("0" bits are applied thereto), gate 124 is enabled, and circuit 110 is described as being in state 0000 (designating the condition of leads A through D, respectively). This state is represented in the State Diagram in FIG. 3 by the circle identified as 301.

In normal state 0000, all output leads of protection switching algorithm circuit 110 are in the high condition; gates 118, 120 and 125 through 128 are therefore enabled; both phase-locked loops are therefore locked to the incoming clock bit; and the outputs of both phase-locked loops are passed to selector unit 117.

The normal 0000 state is maintained so long as the status of the input signal remains good, whereby the potential on input terminal F is high and neither slip detector 114 nor slip detector 115 detects a slip in the output of either phase-locked loop. In the State Diagram in FIG. 3 this is represented by an arc emanating from circle 301 and returning thereto and identified by the expression $F\bar{S}_1\bar{S}_2X$; the term X indicating that the output of tracking detector 109 and, therefore, the signal on input terminal T, is immaterial. The arc is also designated by the expression $FS_1S_2\bar{T}$. Protection switching algorithm circuit 110 therefore remains in the normal state when both slip detectors indicate cycle slippage and tracking detector 109 signals that the loops are not tracking. The occurrence of the latter combination of conditions is considered so unlikely that the normal state is maintained until more definitive information is received from interface unit 102, the slip detectors and tracking detector 109.

Protection switching algorithm circuit 110 will go to state 0010, generally indicated by circle 302 in the State Diagram, in the event that a cycle slip in phase-locked loop 105 is detected by slip detector 115 and tracking detector 109 signals that the loops are not tracking. The path to circle 302 is shown as a line identified by the expression $FS_1\bar{S}_2\bar{T}$.

With protection switching algorithm circuit 110 in state 0100, output leads B and $\bar{C}$ of combinational logic and memory circuit 201 are up, and combinational logic circuit 202 applies a low potential to lead BC, passing an inhibiting voltage to lead INHIBIT I. This disables gates 125 and 126, as previously described, blocking the output of phase-locked loop 205. Phase-locked loop 106 remains locked to the input clock bit and its output continues to be passed to selector unit 117.

Figure 3:
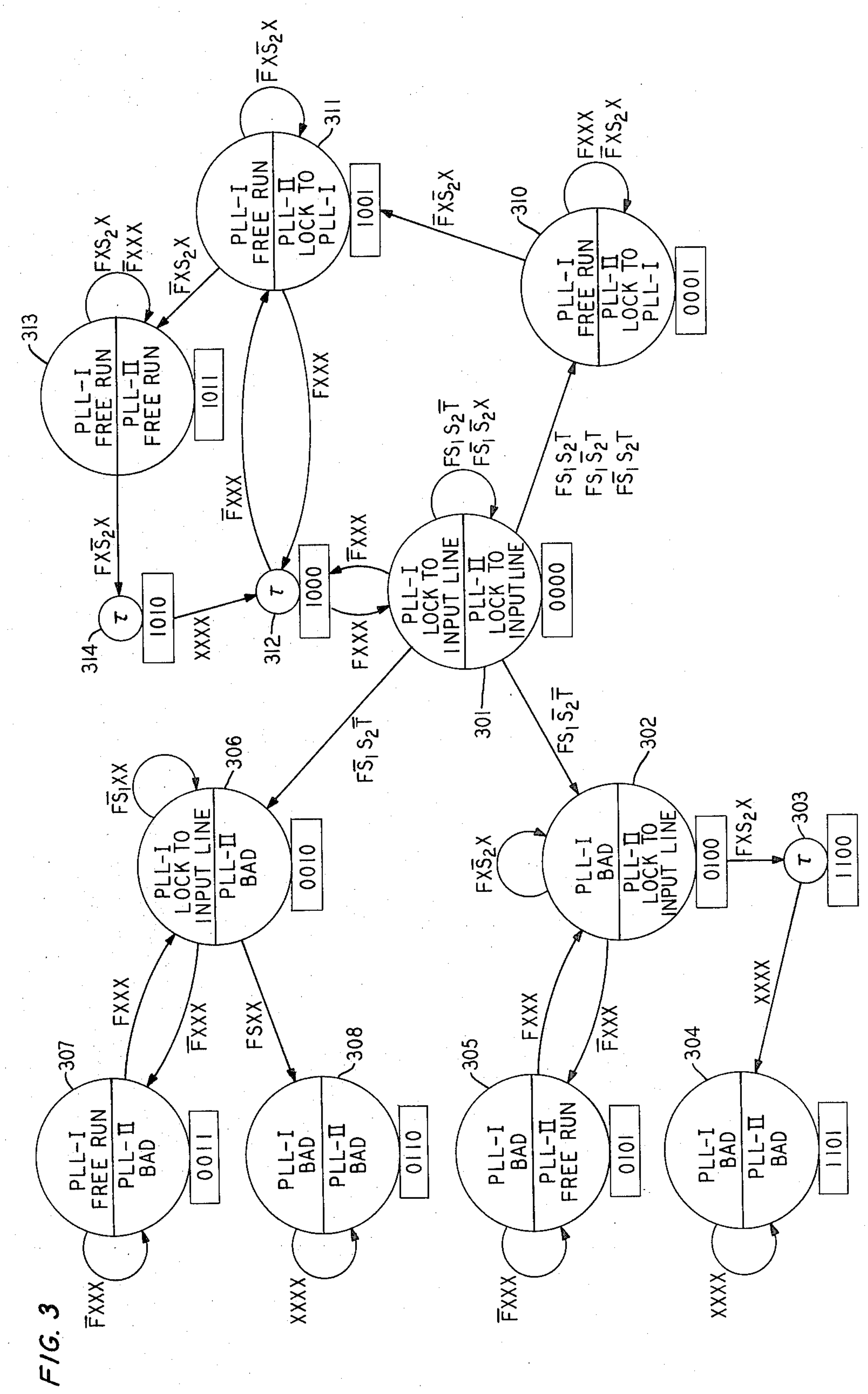
FIG. 3 depicts the various states of the switching circuit together with input information and the output information thereby produced.

Protection switching algorithm circuit 110 remains in state 0100 so long as the status of the input signal remains good and slip detector 115 does not detect a slip in the output of phase-locked loop 106. This is represented in FIG. 3 by an arc emanating from and returning to circle 302 and defined by the expression $FX\bar{S}_2X$ (the X's indicating that the output conditions of slip detector 114 and tracking detector 109 are immaterial).

Assume now that, with protection switching algorithm circuit 110 in state 0100, a slip is detected by slip detector 115. Protection switching algorithm circuit 110 thereupon proceeds along the line identified by the expression $FXS_2X$ to transitional state 1100, identified as circle 303. In this state, and upon the recirculation of the output conditions of flip-flops 204 to 207 back to the input of combinational logic circuit 203, protection switching algorithm circuit 110 proceeds to state 1101, identified as circle 304. Providing an intermediate transitional state prevents race conditions by changing but one memory output condition at a time; thus, two steps are required to change from state 0100 to 1101.

In state 1101, the flip-flops apply high conditions to leads A, B, $\bar{C}$ and D. Combinational logic circuit 202 applies low conditions to leads D + BC; CD + BD; and $B\bar{C}$. These low conditions are passed to leads FREE RUN I, FREE RUN II and INHIBIT I, respectively, disabling gates 118, 120, 121, 125 and 126. Both of the phase-locked loops therefore run free and the output of phase-locked loop 105 is blocked and not passed to selector unit 117. It is to be noted that protection switching algorithm circuit 110 is retained in this state by all input conditions, as shown by the arc emanating from and returning to circle 304, which arc is identified by the expression XXXX. This is a major alarm state and appropriate audio and visual alarms may be raised to indicate that manual correction is required. Returning protection switching algorithm circuit 110 to the normal state 0000 can be achieved only by manual reset, in the manner previously described.

Return now to the condition where protection switching algorithm circuit 110 is in state 0100. In this state, if there be a failure of the good status of the input signal (the potential on terminal F goes low), circuit 110 proceeds along line $\overline{F}XXX$ to state 0101, identified by circle 305. In state 0101, low potentials are applied to lead D + BC; to lead CD + BD; and to lead $B\overline{C}$, and these low potentials are passed to leads FREE RUN I, FREE RUN II and INHIBIT I. Both of the phase-locked loops therefore run free and the output of phase-locked loop 105 is blocked, as previously described.

This 0101 state is retained so long as the status lead remains down, as indicated by the arc emanating from and returning to circle 305, which arc is identified by the expression $\overline{F}XXX$. Upon the return of the status of a good input signal, the potential on input terminal F goes back up and the state of the algorithm circuit proceeds along the line designated FXXX back to state 0100.

Return now to protection switching algorithm circuit 110 in normal state 0000. If a slip in the output of phase-locked loop 106 is detected by slip detector 115 and tracking detector 109 signals that the loops are not tracking each other, the state of the algorithm circuit proceeds along line $F\overline{S}_1S_2\overline{T}$ to state 0010, identified by circle 306. In this state, protection switching algorithm circuit 110 applies a low potential to lead $\overline{A}C$ and thence to lead INHIBIT II to disable gates 127 and 128, blocking the output of phase-locked loop 106. This state is maintained so long as the status of the input signal remains good and slip detector 114 does not detect a slip of the output of phase-locked loop 105, as shown by arc $F\overline{S}_1XX$. In the event, however, that slip detector 114 detects a cycle slippage in the output of phase-locked loop 105, the state of protection switching algorithm circuit 110 proceeds along line $FS_1XX$ to state 0110, identified by circle 308. In this state, phase-locked loop 105 runs free and the output of phase-locked loop 106 is inhibited. This is a major alarm state wherein appropriate audio and visual alarms are raised, and protection switching algorithm circuit 110 can be returned to the normal state only after manual correction and reset are provided.

With protection switching algorithm circuit 110 in state 0010, the loss of good status moves the state of the algorithm circuit along line $\overline{F}XXX$ to state 0011, shown as circle 307. In this state, the algorithm circuit applies low potentials to lead D + BC, to lead $\overline{A}C$ and to lead CD + BD. Low potentials are thus passed to leads FREE RUN I, INHIBIT II and FREE RUN II. Phase-locked loops 105 and 106 are unlocked from the incoming clock bit signal and run free and the outputs of phase-locked loop 106 are blocked. Protection switching algorithm circuit 110 can then return along line FXXX to state 0010 upon the restoration of good status of the incoming signal.

Assume now that protection switching algorithm circuit 110 is in normal state 0000 and interface unit 102 determines that the incoming clock bit is not being properly received and applies a low potential by way of lead 104 and gate 124 to input terminal F of circuit 110. Under this condition, with protection switching algorithm circuit 110 in the normal state, the state of the circuit proceeds along the line identified by the expression $\overline{F}XXX$ to transitional state 1000, shown as circle 312. Protection switching algorithm circuit 110 continues to proceed along a line similarly designated $\overline{F}XXX$ to state 1001, identified as circle 311. The incoming signal is now considered to be bad and, in state 1001, protection switching algorithm circuit 110 applies low potentials through leads D + BC and $\overline{B}CD$ to leads FREE RUN I and II LOCK TO I. This unlocks both phase-locked loops 105 and 106 from the incoming clock bit and locks phase-locked loop 106 to the output of phase-locked loop 105. The presumption now is that both loops are good and, with loop 106 locked to loop 105, both loops are maintained in phase so that there will be no significant change in phase or frequency if loop 105 fails and selector unit 117 switches to the output of standby loop 106.

While the input signal is bad, protection switching algorithm circuit 110 is maintained in state 1001 so long as slip detector 115 does not detect cycle slippage of phase-locked loop 106, as shown by arc $\overline{F}X\overline{S}_2X$. In the event, however, that slip detector 115 detects a cycle slippage, protection switching algorithm circuit 110 proceeds to state 1011 along line $\overline{F}XS_2X$. It cannot now be presumed that both of the loops are still operating properly and both phase-locked loop 105 and phase-locked loop 106 are unlocked to run free. The state is maintained so long as the status of the incoming signal is improper or so long as slippage of phase-locked loop 106 is detected, as seen by the arc identified by the expressions $FXS_2X$; $\overline{F}XXX$.

Assume now that with protection switching algorithm circuit 110 in state 1011, the incoming line signal status is restored by the proper recovery of the clock bit signal and slip detector 115 is no longer detecting any cycle slippage. In this event, protection switching algorithm circuit 110 proceeds from state 1011 along the line identified by the expression $FX\overline{S}_2X$ to the transitional state 1010, shown as circle 314. From this state, protection switching algorithm circuit 110 then proceeds to state 1000 and, assuming that the incoming signal status remains good, back to normal state 0000.

Returning now to state 1001, if interface unit 102 detects that the incoming status of the line signal has restored, protection switching algorithm circuit 110 returns directly to transitional state 1000 along the line identified by the expression FXXX. As previously described, if the incoming status remains good, protection switching algorithm circuit 110 then proceeds back to normal state 0000.

While protection switching algorithm circuit 110 is in the normal state 0000, one or the other or both slip detectors 114 and 115 may signal a cycle slippage of the associated phase-locked loop while tracking detector 109 indicates that the loops are tracking each other even though a loop slippage is detected. The best presumption here is that something is wrong with the input even though a loss of the incoming clock bit has not been detected. The state of protection switching algorithm circuit 110 now advances from the normal state to state 0001, identified as circle 310. This advance proceeds along the line identified by the expressions $FS_1S_2T$; $F\overline{S}_1S_2T$; and $FS_1\overline{S}_2T$.

In state 0001, protection switching algorithm circuit 110 applies a low potential to lead D + BC, which potential is passed to lead FREE RUN I to disable gate 118. Phase-locked loop 105 is thereby unlocked from the input clock bit and runs free. At the same time, protection switching algorithm circuit 110 applies the normal high potential to lead INHIBIT II by way of lead CD+ BD and a low potential to lead II LOCK TO I by way of lead $\overline{BCD}$. This disables gate 120 and enables gate 121, as previously described, and phase-locked loop 106 is unlocked from the incoming clock bit and locked to the output 8 kHz signal from phase-locked loop 105. Finally, protection switching algorithm circuit 110 applies a low potential to lead $\overline{ABCD}$ to set flip-flop 210. The setting of flip-flop 210, as previously described, disables gate 124. This disconnects the F terminal from interface unit 102 and a relatively low potential is thereby maintained on the F terminal.

Protection switching algorithm circuit 110 is initially maintained in state 0001 until the low potential is applied to the F terminal by the disabling of gate 124. Thereafter, algorithm circuit 110 is maintained in state 0001 if slip detector 115 indicates that phase-locked loop 106 has slipped in phase relative to the incoming clock bit signal. This is indicated by the arc designated by the expressions FXXX; $\overline{F}XS_2X$.

Assume now that the low potential is being maintained on terminal F and that slip detector 115 is not detecting cycle slippage. In this event, the state of protection switching algorithm circuit 110 proceeds from state 0001 along the line designated by the expression $\overline{F}X\overline{S}_2X$ to state 1001. In state 1001, phase-locked loop 105 continues to run free and phase-locked loop 106 is maintained locked to the output of phase-locked loop 105, as previously described. The algorithm circuit is maintained in state 1001 so long as slip detector 115 does not detect a cycle slippage, as indicated by the arc designated by the expression $\overline{F}X\overline{S}_2X$. If, with protection switching algorithm circuit 110 in state 1001, cycle slippage is detected by slip detector 115, the state of the algorithm circuit proceeds along the line identified by the expression $\overline{F}XS_2X$ to state 1011, identified by circle 313. In this state, phase-locked loop 105 continues to run free. At the same time, protection switching algorithm circuit 110 applies a low potential to lead FREE RUN II by way of lead CD + BD, whereby phase-locked loop 107 runs free. Flip-flop 210 continues to disable gate 124, maintaining a low potential on input terminal F of protection switching algorithm circuit 110. The algorithm circuit is, therefore, maintained in state 1011 as indicated by the arc designated by the expression $\overline{F}XXX$ until manual correction and reset is provided to return the circuit to normal state 0000.

The details of a slip detector such as detector 114 (of detector 115, which is arranged in substantially the same manner as slip detector 114) are shown in FIG. 6. In general, the slip detector comprises a phase comparator, consisting of divide-by-two counter 601 and flip-flop 602, five-stage ripple counter 604 and a sequential machine, consisting of combinational logic circuit 605 and memory flip-flops 606 and 607. The phase comparator compares the 8 kHz square wave output of the phase-locked loop with the incoming clock bit signal, developing an output wave pulse whose width is controlled by the difference in phase between the two input waves. This pulse width controls the number of high frequency pulses which are applied to counter 604. Counter 604 counts the pulses, the pulse number count indicating whether (1) the angle of phase error is sufficiently small so as to exist in a region wherein the loop is considered to be in substantial phase lock; (2) the phase of the loop leads the phase of the incoming clock bit signal by an angle outside the region of substantial phase lock but less than an excessive angle such as 90 degrees; (3) the phase of the loop lags the phase of the incoming clock bit signal by an angle outside the region of substantial phase lock but less than an excessive angle such as 90 degrees; and (4) the phase error angle is greater than an excessive angle, such as 90 degrees. It is the general function of the sequential machine to read the pulse number counts, proceed to machine "states" in accordance with the count readings and designate that a cycle slip has occurred when the phase error angle passes from the phase lag to the phase head regions or from the phase lead to the phase lag regions without passing through the region of substantial phase lock.

The incoming clock bit signal passed through gate 118 is applied to the TOGGLE and J input terminals of flip-flop 602. The K input terminal of flip-flop 602 is tied to ground. The CLEAR input of the flip-flop is connected to the output of divide-by-two counter 601; the input of divide-by-two counter 601 being connected to the 8 kHz square wave output of the phase-locked loop. Divide-by-two counter 601, therefore, provides a 4 kHz square wave, depicted as timing wave 5C in FIG. 5. Flip-flop 602 is maintained in the CLEAR condition so long as the potential of the 4 kHz square wave is low. When the 4 kHz square wave potential is high, however, flip-flop 602 is toggled to the SET condition by the positive-going transition of the clock bit signal.

When flip-flop 602 is in the CLEAR condition, the potential on output terminal Q is low. Conversely, when flip-flop 602 is in the SET condition, the potential on output terminal Q is high. Accordingly, the output wave on terminal Q comprises a pulse rising in potential when the leading edge of the clock bit pulse is applied to the flip-flop (and the potential of the 4 kHz wave is high) and falling in potential when the 4 kHz wave potential goes low, as shown in timing wave 5D in FIG. 5. It is apparent that when the 8 kHz square wave output of the loop is exactly in phase with the clock bit signal, the width of the pulse on terminal Q is the same as the width of the 8 kHz square wave pulse.

In the timing waves shown in FIG. 5 the phase of the 8 kHz square wave 5B is slightly leading the phase of the clock bit wave 5A. The 4 kHz square wave 5C is, of course, aligned with the 8 kHz square wave. As a consequence, the pulse width of the wave at output terminal Q is somewhat smaller than the 8 kHz square wave pulse. With the loop leading in phase, the maximum possible phase error would result in a pulse of negligible width. Similarly, if the 8 kHz square wave of the output of the phase-locked loop lags the clock bit signal, the pulse width on output terminal Q would exceed the width of the 8 kHz square wave pulse. With the loop lagging in phase, the maximum possible phase error would result in a pulse having almost the same width as the 4 kHz square wave pulse.

Wave 5D at output terminal Q is applied to gate 603, enabling the gate during the relatively positive pulse interval produced at the terminal. The other input to gate 603 extends to the 256 kHz square wave output of the phase-locked loop. Since the maximum pulse width is the same as the width of the 4 kHz square wave pulse, gate 603 passes a plurality of the 256 kHz square wave pulses up to a maximum of 32 pulses, the specific number of pulses depending upon the width of the pulse at terminal Q and the width of the pulse depending, in turn, on whether the loop signal lags or leads and the lag or lead phase angle.

The pulses passed through gate 603 are counted by five-stage counter 604, the counter being periodically reset by the 4 kbs clear pulse output of the phase-locked loop.

The three most significant digits of the counts in counter 604 are indicated on output lead pairs $C\overline{C}$, $D\overline{D}$ and $E\overline{E}$. These output lead pairs are passed to combinational logic circuit 605.

It is recalled that the width of the pulse of timing wave 5D is approximately equal to the width of the 8 kHz square wave output of phase-locked loop 105 when the loop is substantially locked to the incoming clock signal. Under this condition, the count in counter 604 should constitute approximately one-half the total count of 32. This region of substantial phase lock is arranged to be from the count of 12 to the count of 19. The three most significant digits in the counter output are 011 for the counts of 12 through 15 and are 100 for the counts of 16 through 19. The counts for the "phase lead region" are arranged to be from eight to 11, for example, and the three most significant digits in counter 604 output are 010. The counts for the "phase lag" region of the phase-locked loop are arranged to be from 20 to 23 and the three most significant digits developed thereby in counter 604 are 101. A leading phase error beyond the phase lead region produces counts of zero through seven, the most significant digits being 000 or 001 and a lagging phase error beyond the phase lag region produces counts from 24 through 31 and the most significant digits are 110 or 111.

It is a function of the sequential machine to first determine the phase region of the loop, to then determine if the loop goes from the phase lead region to the phase lag region or from the lag region to the lead region without proceeding through the region of substantial phase lock. If this latter situation occurs, the sequential machine presumes that the loop proceeded from the phase lead or lag region in one cycle, through 180° phase error, to another cycle and that a slip has therefore occurred.

The function of providing the logic for determining a phase slip is provided by combinational logic circuit 605. Combinational logic circuit 605 comprises static logic circuits arranged to respond to the permutations of input conditions provided by counter 604, together with the present state conditions provided by the outputs of flip-flops 606 and 607 to develop the next state outputs on output lead pairs $A\overline{A}$ and $B\overline{B}$ of combinational logic circuit 605. The summary of the various possible input permutations from counter 604 together with the present state input conditions at the outputs of flip-flops 606 and 607 are defined in the Next State Transmission Table, shown in FIG. 7. In the Table, each horizontal row defines one of the several present states (input leads A and B) of combinational logic circuit 605 and each vertical column defines one permutation of the most significant digit outputs (C, D and E) of counter 604. The intersection of each row and column defines "next state"which constitutes the permutation of output conditions on output lead pairs $A\overline{A}$ and $B\overline{B}$ of combinational logic circuit 605 when the input conditions conform to that row and column. This "next state" output is stored in flip-flops 606 and 607 which, in turn, present the "state" to combinational logic circuit 605 on input leads A and B.

It is recalled that the counter output is 011 or 100 when the phase-locked loop is in the substantial lock region. As seen in the Next State Transmission Table for combinational logic 605, the logic circuit always presents the next state of 00 at its outputs when the counter output is 011 or 100 and "1" bits are applied by combinational logic circuit 605 to output leads $\overline{A}$ and $\overline{B}$, clearing flip-flop 606 and flip-flop 607. The flip-flops, in the CLEAR condition, store this next state, presenting the state (00) on input leads A and B to combinational logic circuit 605.

Assume now that the sequential machine is in state 00 and that the phase of the loop leads by an angle which stores a number in counter 604 having the most significant digits of 010. As seen in the Next State Transmission Table, the intersection of row 00 and column 010 defines that the next state comprises the state 01. A "1" bit is provided to output lead B of logic circuit 605, setting flip-flop 606. The potential on the output terminal of flip-flop 606. The potential on the output terminal of flip-flop 606 rises, whereby the conditions on input leads A and B of combinational logic circuit 605 define the next state 01. Similarly, if the phase of the loop should lag, the most significant digit output of counter 604 is 101 and the next state as defined by the intersection of row 00 and column 101 is 10. Flip-flop 607 is set and the next state 10 is presented to input leads A and B of combinational logic circuit 605. The asterisks along the row of present state 00 define count situations that cannot occur, since the slow drift of the phase of the phase-locked loop must pass through the phase lead region (count 010) or the phase lag region (count 101) when starting from the substantial lock region.

Assume now that combinational logic circuit 605 is in state 01. As seen along row 01 in the Next State Transmission Table of FIG. 7, the sequential machine will return to the next state 00 if the counter provides the most significant digit count of 011 or 100 and will remain in the state 01 for all other counts, with the exception of the counts having the most significant digits 101. In this latter event, the sequential machine proceeds to next stage 10, as seen at the intersection of row 01 and column 101. In addition, the sequential machine presumes that the loop has advanced (slipped) a cycle, indicated by the next state 10 designation being underlined in the Next State Transmission Table.

Combinational logic circuit 605 includes a network of static logic elements, strobed by the 4 kHz strobe pulse output of phase-locked loop 105, which provide an output pulse designating that a slip has occurred when the input conditions satisfy the algebraic condition of $BC\overline{D}E$, the pulse being provided to the output lead designated by the corresponding algebraic expression. This pulse is passed through OR gate 608 to the output lead SLIP, which constitutes the output of the slip detector. As previously described, the output lead of the slip detector is connected to an input terminal, such as input terminal $S_1$, of protection switching algorithm circuit 110.

If the sequential machine is in state 10, it returns to the next state 00 if the counter provides the most significant digit count of 011 or 100. For all other counts the sequential machine remains in state 10, with the exception of the counts having the most significant digits of 010. In this event, the sequential machine proceeds to next state 01, as seen at the intersection of row 10 and column 010. In addition, the sequential machine presumes that the loop has slipped a cycle, indicated by the next state 01 designation being underlined in the Next State Transmission Table. With the input conditions to combinational logic circuit 605 satisfying the algebraic expression $A\bar{C}D\bar{E}$, a pulse is provided to the output lead designated by the corresponding algebraic expression in response to the 4 kHz strobe pulse from the phase-locked loop. This pulse is passed through OR gate 608 to output lead SLIP and is passed on to input terminal $S_1$ of protection switching algorithm circuit 110.

Although a specific embodiment of this invention has been shown and described, it will be understood that various modifications may be made without departing from the spirit of this invention.

We claim:

1. A system for recovering clock signals from an incoming signal train comprising:

- a first and a second local oscillator, each oscillator including means for phase locking the oscillator to signals applied to an input thereof and being arranged to run freely upon a blockage of the application of signals to the input,
- comparing means for detecting phase slippage between output signals of one of the two oscillators and the input signals,
- tracking means for detecting an excess of a predetermined difference in phase between output signals of the two oscillators,
- means for normally applying the incoming signal train to the input of each of the oscillators, and
- means responsive to the detection of phase slippage and to absence of the detection of the excessive phase difference for blocking the application of signals to the input of the first oscillator and phase locking the second oscillator to output signals of the first oscillator.

2. A system, as in claim 1, wherein there is further included means effective when the second oscillator is phase locked to the first oscillator and responsive to phase slippage between the output signals of both oscillators for unlocking the second oscillator from the output of the first oscillator.

3. A clock recovery system wherein a master clock and a standby clock are phase locked to signals applied to inputs thereof and run freely upon a blockage of the application of signals to the inputs and outputs therefrom are applied to an output gating unit,

CHARACTERIZED IN THAT the clock recovery system further includes:

- means for comparing the output of one clock to the output of the other clock to detect an excess of a predetermined difference in phase,
- means for comparing the output of each clock to the input signals thereof to detect phase slippage,
- means for normally applying an incoming signal train to the inputs of the master clock and standby clock, and
- logic means responsive to absence of the detection of the excessive phase difference and to the detection of phase slippage for blocking the application of input signals to the master clock and phase locking the standby clock to the output of the master clock.

4. A clock recovery system, in accordance with claim 3, wherein there is further included logic means responsive to absence of the incoming signals for unlocking each clock from the incoming signal train and phase locking the standby clock to the output of the master clock.

5. A clock recovery system, in accordance with claim 4, wherein there is further included means responsive to restoration of the incoming signal train for again phase locking the master clock and the standby clock to the incoming signal.

6. A clock recovery system, in accordance with claim 4, wherein there is further included means effective when the standby clock is phase locked to the master clock and responsive to detection of phase slippage between the output of the standby clock and the output of the master clock for unlocking the standby clock from the master clock whereby both clocks run free.

* * * * *